United States Patent
Li et al.

(10) Patent No.: US 9,875,186 B2
(45) Date of Patent: Jan. 23, 2018

(54) SYSTEM AND METHOD FOR DATA CACHING IN PROCESSING NODES OF A MASSIVELY PARALLEL PROCESSING (MPP) DATABASE SYSTEM

(71) Applicant: Futurewei Technologies, Inc., Plano, TX (US)

(72) Inventors: Huaizhi Li, Belmont, CA (US); Qingqing Zhou, Santa Clara, CA (US); Guogen Zhang, San Jose, CA (US)

(73) Assignee: FutureWei Technologies, Inc., Plano, TX (US)

( * ) Notice: Subject to any disclaimer, the term of this patent is extended or adjusted under 35 U.S.C. 154(b) by 166 days.

(21) Appl. No.: 14/794,750

(22) Filed: Jul. 8, 2015

(65) Prior Publication Data

US 2017/0010968 A1  Jan. 12, 2017

(51) Int. Cl.
   *G06F 12/08* (2016.01)
   *G06F 12/0842* (2016.01)
   (Continued)

(52) U.S. Cl.
   CPC ...... *G06F 12/0842* (2013.01); *G06F 12/0646* (2013.01); *G06F 17/3048* (2013.01);
   (Continued)

(58) Field of Classification Search
   CPC .......... G06F 2212/608; G06F 12/0842; G06F 17/3048; G06F 12/0646; G06F 17/30545; G06F 2212/1041; G06F 2212/154; G06F 2212/284; G06F 2212/6042; G06F 2212/1016
   See application file for complete search history.

(56) References Cited

U.S. PATENT DOCUMENTS

2006/0253507 A1* 11/2006 Schank ................. H04L 67/125
2008/0120273 A1   5/2008 Ramesh et al.
(Continued)

FOREIGN PATENT DOCUMENTS

CN        102521297 A        6/2012

OTHER PUBLICATIONS

International Search Report and Written Opinion dated Oct. 13, 2016 in International Patent Application No. PCT/CN2016/088898, 12 pages.

*Primary Examiner* — David X Yi
*Assistant Examiner* — Zubair Ahmed

(57) ABSTRACT

The present technology relates to managing data caching in processing nodes of a massively parallel processing (MPP) database system. A directory is maintained that includes a list and a storage location of the data pages in the MPP database system. Memory usage is monitored in processing nodes by exchanging memory usage information with each other. Each of the processing nodes manages a list and a corresponding amount of available memory in each of the processing nodes based on the memory usage information. Data pages are read from a memory of the processing nodes in response to receiving a request to fetch the data pages, and a remote memory manager is queried for available memory in each of the processing nodes in response to receiving the request. The data pages are distributed to the memory of the processing nodes having sufficient space available for storage during data processing.

9 Claims, 9 Drawing Sheets

(51) Int. Cl.
*G06F 17/30* (2006.01)
*G06F 12/06* (2006.01)

(52) U.S. Cl.
CPC ............... *G06F 17/30545* (2013.01); *G06F 2212/1016* (2013.01); *G06F 2212/1041* (2013.01); *G06F 2212/154* (2013.01); *G06F 2212/284* (2013.01); *G06F 2212/608* (2013.01); *G06F 2212/6042* (2013.01)

(56) References Cited

U.S. PATENT DOCUMENTS

| | | | |
|---|---|---|---|
| 2009/0271385 A1* | 10/2009 | Krishnamoorthy | G06F 17/30445 |
| 2014/0108633 A1 | 4/2014 | Dai et al. | |
| 2014/0280021 A1 | 9/2014 | Singamshetty | |
| 2014/0310373 A1 | 10/2014 | Aviles et al. | |
| 2016/0041906 A1* | 2/2016 | Mukherjee | G06F 17/30315 711/119 |

* cited by examiner

SYSTEM AND METHOD FOR DATA CACHING IN PROCESSING NODES OF A MASSIVELY PARALLEL PROCESSING (MPP) DATABASE SYSTEM

BACKGROUND

A massively parallel processing (MPP) database management system is designed for managing and processing very large amounts of data. In general, a MPP database system comprises at least one coordinator node and multiple data processing nodes. Coordinator nodes (or coordinators) are the front end of MPP database systems and coordinate with the data processing nodes (also called processing nodes). Clients connected to a MPP database submit queries to the coordinators, which dispatch queries to the processing nodes for execution. The coordinator nodes and processing nodes together form a MPP database cluster. In the MPP database, tables are divided into partitions and distributed to different processing nodes. The processing nodes manage and process their portion of the data, which may be performed in parallel on each of the processing nodes.

However, a processing node may not have all of the required information to execute a query. For example, for a hash join query process, a particular partition key may not be the same as a join key. Thus, the processing nodes may communicate with one another to exchange necessary information in order to complete the processing. In the case of a database join or aggregation operation, if the tables formed during the operation are too large and insufficient memory is available on the processing node performing the hash, the tables (or partitions) are spilled to disk from the memory of the processing node. After spilling the tables to disk, the processing nodes may proceed with the hash join or aggregation operation.

However, spilling is both a time-consuming and expensive operation. Moreover, the table partitions may not be evenly distributed on the processing nodes as a result of data skew, thereby resulting in an uneven or unbalanced load. In an unbalanced load, some processing nodes end up having insufficient space in memory to process data, while other processing nodes have an over-abundance of sufficient memory.

BRIEF SUMMARY

In one embodiment, a method of managing data caching in processing nodes of a massively parallel processing (MPP) database system is provided, including maintaining a directory including a list of data pages, the list of data pages stored in one or more data tables, and a storage location of the data pages in the MPP database system, monitoring memory usage in one or more of the processing nodes of the MPP database system by exchanging memory usage information with each of the one or more processing nodes in the MPP database system, each of the one or more processing nodes managing a list of the one or more processing nodes and a corresponding amount of available memory in each of the one or more processing nodes based on the memory usage information, reading data pages from a memory of the one or more processing nodes in response to receiving a request to fetch the data pages, and querying a remote memory manager for available memory in each of the one or more processing nodes in response to receiving a request and distributing the data pages to the memory of one of the one or more processing nodes having sufficient space available for storage during data processing by the one or more processing nodes.

In another embodiment, a node for processing data in a massively parallel processing (MPP) database system is provided, the node including an execution engine requesting a data page, the request including identifying data page information corresponding to the data page, a memory load monitor to monitor memory usage and availability of memory in one or more processing nodes of the MPP database system, and a remote cache module including a data page directory to maintain data pages in one or more data tables and a location of the data pages stored in the memory of the one or more processing nodes in the MPP database system, a remote memory manager to manage the memory on the one or more processing nodes and to exchange memory information with each of the one or more processing nodes in the MPP database system, the remote memory manager maintaining a list of the one or more processing nodes and a corresponding amount of available memory in each of the one or more processing nodes as determined by the memory load monitor, a local reader to fetch the data pages having the identifying data page information from one of the processing nodes in response to receiving a request from the execution engine, and a local writer to query the remote memory manager for available space in the memory of each of the one or more processing nodes in response to receiving a request from the execution engine and to distribute the data pages to the memory of the one or more processing nodes having sufficient space available as determined by the remote memory manager.

In still another embodiment, a computer-readable storage device comprising instructions which cause one or more processors to execute a method of managing data caching in processing nodes of a massively parallel processing (MPP) database system is provided, including maintaining a directory including a list of data pages, the list of data pages stored in one or more data tables, and a storage location of the data pages in the MPP database system, monitoring memory usage in one or more of the processing nodes of the MPP database system by exchanging memory usage information with each of the one or more processing nodes in the MPP database system, each of the one or more processing nodes managing a list of the one or more processing nodes and a corresponding amount of available memory in each of the one or more processing nodes based on the memory usage information; reading data pages from a memory of the one or more processing nodes in response to receiving a request to fetch the data pages, and querying a remote memory manager for available memory in each of the one or more processing nodes in response to receiving a request and distributing the data pages to the memory of one of the one or more processing nodes having sufficient space available for storage during data processing by the one or more processing nodes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

The present disclosure, generally described, relates to technology for caching and spill handling of data in a MPP database system, and in particular, to a remote cache module to manage caching and spill handling of data to memory (for example, cache memory) on processing nodes of a MPP database to balance the load and resolve data skew. The remote cache module is located on each of the processing nodes in the MPP database system and is responsible for managing memory allocation throughout the MPP database system. Memory usage and availability is monitored at each processing node to determine the local work memory configuration or availability, which may then be shared with each other processing node in the system. The shared information becomes available to the remote cache module at each processing node such that the remote cache module may manage data allocation in the system.

When a processing node executes a query distributed by a coordinator, the memory on the processing node is accessed by the remote cache module to determine whether sufficient memory space is available to process the query. When sufficient space is available in the memory of the local processing node, an execution engine at the local processing node executes the query. Otherwise, when the remote cache module determines that insufficient space is available in the memory of the local processing node, the data is spilled to memory of another (remote) processing node in the MPP database system in which sufficient space is available. The spilled data may be cached in memory of the remote processing node and executed in parallel with the data on each of the other processing nodes in the MPP database system, including the local processing node. Spill handing and caching of data across multiple processing nodes in the system thereby resolves the issue of outdated data in any one node, alleviates uneven or unbalanced distribution of data and improves overall performance by reducing resource consumption in the MPP database system.

The present disclosure relates to technology for caching and spill handling of data in a massively parallel processing (MPP) database system. A remote cache module at each node is responsible for managing memory allocation throughout the MPP database system. Memory usage is monitored at each node to determine memory availability and is shared with each other node. The shared information becomes available to the remote cache module at each node to manage data allocation. When a node executes a query, the memory on the node is accessed by the remote cache module to determine whether sufficient space is available to implement the query. When sufficient space is available in memory of the local node, the query is executed locally. Otherwise, when insufficient space is available in the memory, the data is spilled to memory of another node in the MPP database system in which sufficient space is available.

Figure 1:
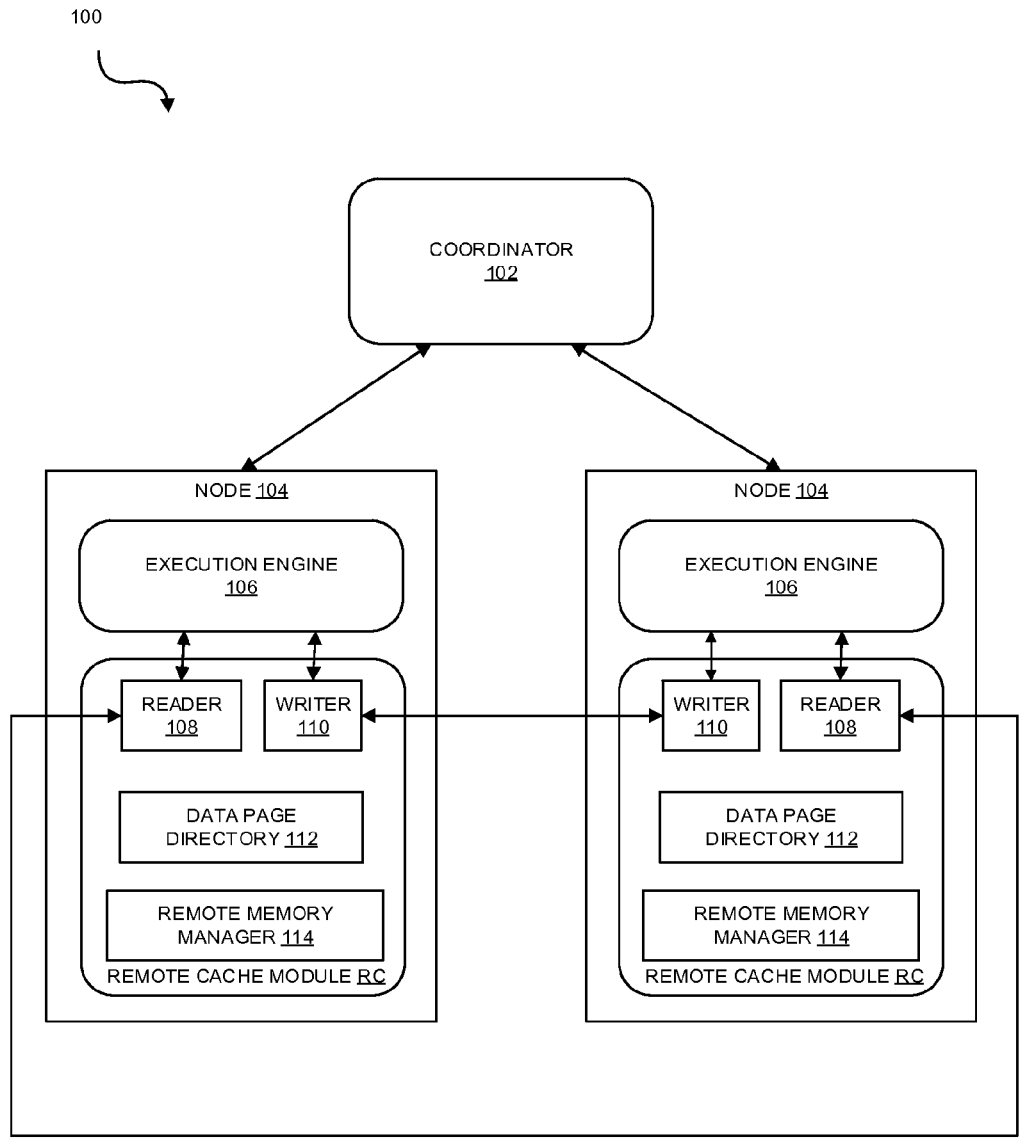
FIG. 1 is an exemplary diagram of a node for processing data in a massively parallel processing system.
Figure 9:
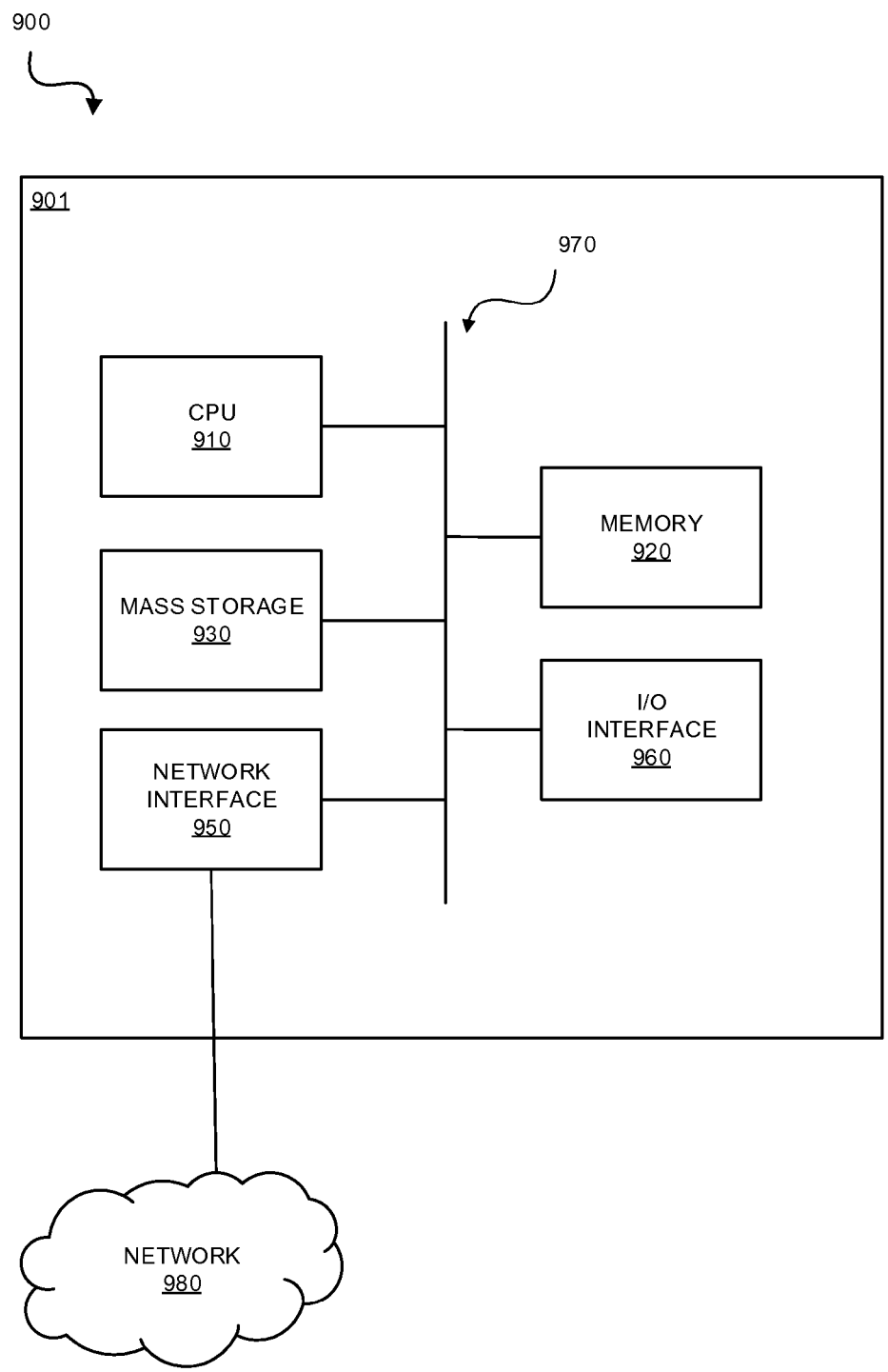
FIG. 9 shows an exemplary general computer system that may be used to implement the system depicted in FIGS. 1, 2 and 4.

FIG. 1 is an exemplary diagram depicting a MPP database system 100 for managing memory in multiple processing nodes of a MPP database system. The MPP database system 100 depicts a coordinator node (or coordinator) 102 and processing nodes 104 communicatively coupled to each other and the coordinator 102. It should be understood that the MPP database system 100 can include any number of processing nodes 104. The communications may be transferred over wired links, such as an Ethernet cable or the like, and/or wireless links to access nodes or one or more networks, such as network 980 (FIG. 9). In an embodiment, the coordinator 102 and processing nodes 104 are coupled to a local-area network (LAN) or a wide-area network (WAN) for data processing and communications with each other and remote devices, such as other processing units, the Internet, remote storage facilities, or the like. However, any communication link or communication arrangement can be employed. The processing nodes 104 may also include, in one embodiment, processing sub-nodes that may comprise any combination of a physical processing and storage device, or physical or logical partition of processing and storage device, that enables propagation of data to the appropriate other processing nodes 104 for processing in a parallel manner. The coordinator 102 may be a node operating independently from processing nodes 104, or may be part of any one or more of the processing nodes in the system 100.

Figure 2:
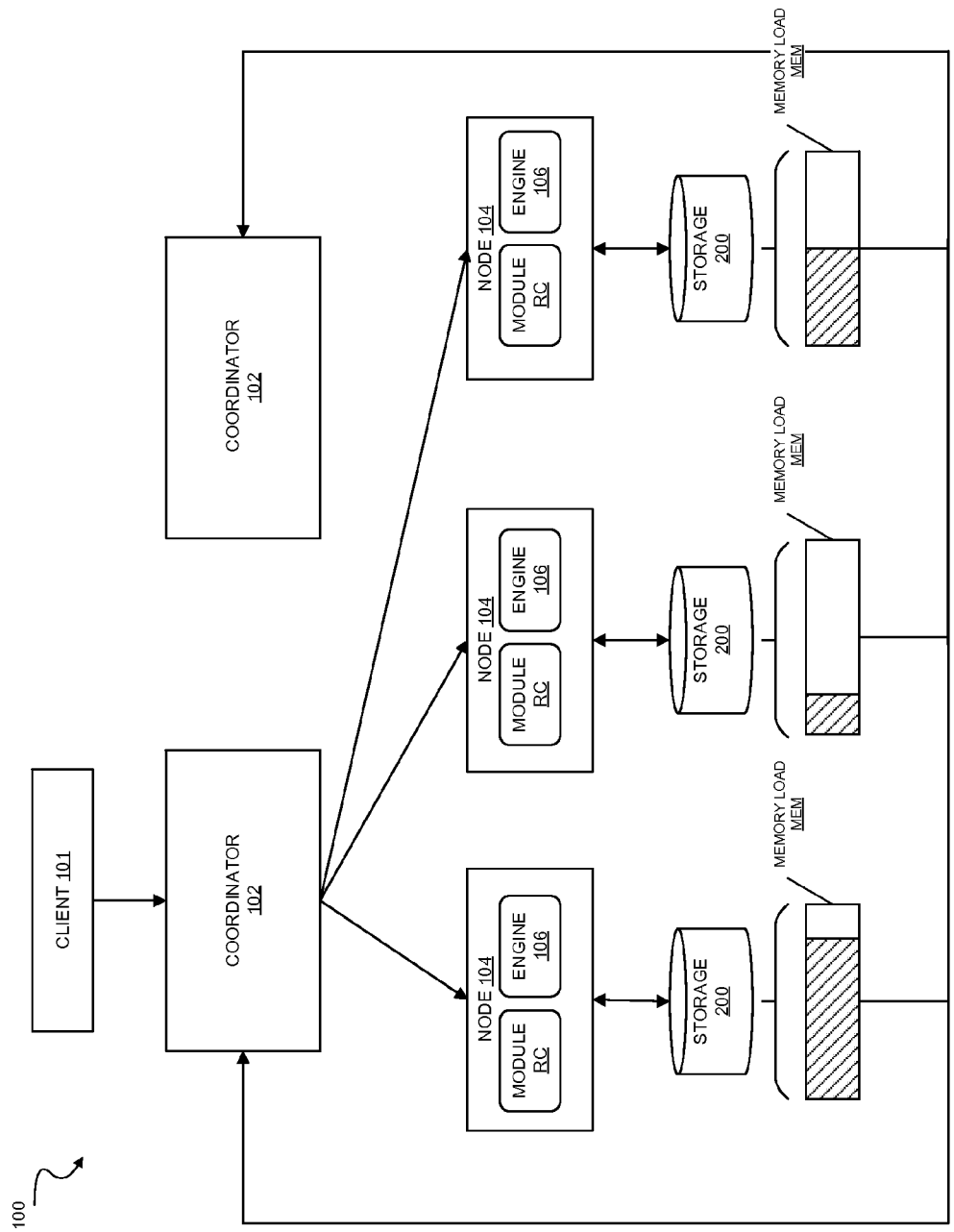
FIG. 2 is an exemplary drawing depicting a system for processing queries of a client in accordance with FIG. 1.

In operation, the coordinator 102 receives query requests from a client node (or client) 101 (see FIG. 2). In response, the coordinator 102 may compile the query and create a query plan (described below). The coordinator 102 may further subdivide the query plan into segments and send the query plan segments to each of the processing nodes 104 for local execution at each processing node 104. The coordinator is described in more detail with reference to FIG. 4 below.

The processing nodes 104, which are communicatively coupled to the coordinator 102, include an execution engine 106 and a remote cache module RC (the remote cache module is located at both local and remote processing nodes, despite its "remote" name). The execution engine 106 of the processing node 104 executes the query request by the client 101, forwarded by the coordinator 102. The remote cache module RC, among other features, manages memory space in the MPP database system to utilize available memory in which to store data during query execution. In one embodiment, the remote cache modules RCs collectively operate to implement and manage the caching and spill handling capability of the MPP database system 100.

The remote cache module RC includes, but is not limited to, a reader 108, a writer 110, a data page directory 112, and a remote memory manager 114. It is appreciated that that the system 100 is not limited to a single coordinator and two processing nodes as depicted, and may include any number of coordinators and processing nodes or clusters. Likewise, the processing nodes and remote cache module are not limited to the disclosed embodiments.

The remote memory manager 114 (the remote memory manager is located at both local and remote processing nodes, despite its "remote" name) of the remote cache module RC manages memory (e.g., memory 822 in FIG. 8) and storage (e.g., storage 200 in FIG. 2) to be used for caching operations in the MPP database system 100. The memory managed by the remote memory manager 114 includes memory on a local processing node (or a local memory) and memory on remote processing nodes (or a remote memory). Although the memory may be referred to herein as cache memory, it is not limited to such an embodiment. Any type of memory known to the skilled artisan may be employed.

As depicted in FIG. 1 by arrows, readers 108 and writers 110 in each processing node 104 are communicatively connected to one another, including across processing nodes 104. These connections allow for the exchange of memory information (e.g., the amount of available memory, the location of data in the memory, etc.) between processing nodes 104 such that each remote memory manager 114 on a corresponding processing node 104 has a global view of the memory in the MPP database system 100 (e.g., a view of the memory as-a-whole in the entire system). In one embodiment, the memory information may be exchanged by piggybacking on the heart-beat messages of the MPP database system 100. The exchanged cache memory information may be stored by each remote memory manager 114 to include, for example, a list of processing nodes 104 and corresponding information about the memory on each processing node 104.

The data page directory 112 of the remote cache module RC manages data pages of a data page table and the location of the data pages in memory. The data pages can be located in the memory of a local processing node 104 or a remote processing node 104 of the MPP database system 100. For each entry in the data page directory 112, a key may determine to which data table and database the data page belongs, as well as the location of the data page (e.g., whether on local processing node or remote processing node). The key may include, for example, one or more of a node name, query ID, database name, relation name, and/or page ID.

The reader 108 of the remote cache module RC reads or fetches data pages from memory (e.g., cache memory) in locally or remotely located processing nodes 104. The reader 108 communicates with the execution engine 106 on the local processing node 104 and with other readers 108 on the remote processing nodes 104.

When the execution engine 106 is provided with a query from the coordinator 102 (such as to create an execution plan), the execution engine 106 requests information from the remote cache module RC. Specifically, the execution engine 106 queries the reader 108 on the local processing node 104 for a data page stored in the data page directory 112 by providing, for example, the page ID, table and database of the data page. The reader 108 accesses the data page directory 112 at the local processing node 104 for the requested page data. Upon accessing the data page directory 112 of the local processing node 104, and after determining that the data page is located in the memory of the local processing node 104, the reader 108 fetches the data page from the data page directory 112 and sends the data page to the execution engine 106. However, if the requested data page is determined to be on a remotely located processing node 104 (e.g., the data page directory 112 indicates that the requested data page is stored on another processing node), the local reader 108 sends the request from the execution engine 106 to a remote reader 108 located on the remote processing node 104. The remote reader 108 retrieves the memory location of the data page from the remote data page directory 112. The remote reader 108 sends the data page to the local reader 108 on the local remote processing node 104. Implementation of the reader 108 is described below with reference to FIG. 5.

The local writer 110 of the remote cache module RC on the local processing node 104 communicates with the execution engine 106 and a remote writer 110 on remote processing nodes 104. The local writer 110 is responsible for writing data pages to the memory (e.g., cache memory) of the local and remote processing nodes 104 of the MPP database system 100. The execution engine 106, in addition to requesting information from the local reader 108, also instructs the local writer 110 to write or distribute information to memory. For example, when the execution engine 106 wants to write a data page to memory, the execution engine 106 sends the data page to be written to the local writer 110. In response to the write request, the local writer 110 accesses the remote memory manager 114 to determine the available space in the local memory of the local processing node 104. If the local writer 110 determines that sufficient space is available in the local memory of the local processing node 104, the local writer 110 writes the data page to memory in the local processing node 104 and updates the data page directory 112 in the local processing node 104. Otherwise, if it is determined by the local writer 110 that insufficient space is available in memory of the local processing node 104, the local writer 110 of the local processing node 104 distributes the data page to a remote writer 110 of a remote processing node 104. In some embodiments the remote processing node 104 has been determined to be a processing node having a largest amount of available memory space, as explained below. The remote writer 110 then writes the data page to the memory and adds an entry to the data page directory 112 on the same remote processing node 104.

The MPP database system 100 and remote cache module RC also support batch data page writing. Similar to regular (non-batch) data page writing (described above), batch data pages may be written to memory as determined by the remote cache module RC. However, in batch data page writing mode, the batch data pages are written to the same processing node 104, rather than distributing the data pages among remote cache modules RC at different processing nodes 104 in the MPP database system 100. During batch data page writing, the execution engine 106 instructs the local writer 110 to batch write the data pages and sends the batch of data pages to the local writer 110 at the local processing node 104. In response, the local writer 110 accesses the remote memory manager 114 to locate a processing node 104 with sufficient memory space to write the batch of data pages. In order to identify the batch data pages in memory for later retrieval, an argument parameter, such as a batch ID, is added to identify the batch. The execution engine 106 sends the batch data pages with the batch ID to the local writer 110 at the local processing node 104, which then writes the batch data pages to the identified memory. For example, if the local memory in the local processing node 104 has sufficient space, the batch data pages are written to the local memory. Otherwise, the batch data pages are written to remote memory on a remote processing node 104 (assuming sufficient space) upon distribution of the batch data pages from the local writer 110 on the local processing node 104 to the remote writer 110 on the remote processing node 104. Entries are also added to the data page directory 112 of the selected processing node 104 for itemizing the batch data pages with the appropriate batch IDs. In the event that insufficient memory is available on any processing node 104, batch data page writing may be replaced with the regular data page writing, as described above. Implementation of the writer 110 is described below with reference to FIG. 6.

Upon completion of the query by the execution engine 106, the execution engine 106 instructs the remote cache module RC to recycle the memory of the processing node 104 storing the data page directory 112. For memory recycling, the remote cache module RC searches the data page directory 112 with the query ID and table information, deletes the related data pages, and deallocates the memory.

FIG. 2 is an exemplary drawing depicting a system for processing queries of a client in accordance with FIG. 1. As illustrated in FIG. 2, the MPP database system 100 comprises a coordinator 102 commutatively coupled to a plurality of processing nodes 104. Each processing node 104 may be communicatively coupled to a corresponding storage system 200. Each storage system 200 may report a memory load characteristic (MEM) to a coordinator(s) 102. A description of the processing nodes 104 (including the remote cache module RC and execution engine 106) may be found above with reference to FIG. 1, and is not repeated herein. Executing queries may involve developing a global execution plan, including one or more local plan segments that outline the processing flows for the processing nodes 104. The processing nodes 104 may have access to a memory partition and/or partition location of the MPP database system 100 and may also be configured to optimize the global execution plan and/or corresponding segments of the global execution plan, and thereafter to execute corresponding plan segments to produce a query result. A detailed explanation of generating and optimizing the global execution plan may be found with reference to FIG. 3 below.

In various embodiments, the storage systems 200 may be integrated into or peripherally connected to the processing nodes 104. The storage systems 200 may comprise one or more databases, storage systems, disks, optical media or any other known device capable of storing data. In one embodiment, the storage systems 200 are communicatively connected to the processing nodes 104 and may each store data pages and data page tables, including a partition or multiple partitions of a distributed data page table. Together, the storage systems 200 contain the data for the complete database or data page table. The memory load MEM for each storage system 200 is also illustrated for a corresponding processing node 104. The memory load MEM is representative of the amount of space that is available on each storage system 200. Although illustrated as the memory load MEM of a corresponding storage system 200, the memory load MEM may also be applied to represent the internal memory, such as memory 822 (FIG. 8), of the processing node 104. For example, in the illustrated embodiment, the memory load MEM associated with each of the processing nodes 104 (from left to right in the diagram) may be operating at approximately ninety percent (90%), twenty-five percent (25%) and fifty percent (50%), respectively.

In operation, the coordinators 102 receive query requests from the client 101. In response, the coordinator 102 compiles the query and creates a query plan. In one embodiment, the coordinator 102 further subdivides the query plan into segments and sends the query plan segments to each of the processing nodes 104 for local execution on each of the processing nodes 104. During processing across the MPP database system 100, factors such as data skew or input/output loads (I/O loads), may cause memory usage and availability at the various processing nodes 104 to become uneven or unbalanced. In an embodiment, each of the processing nodes 104 monitor, via a memory load monitor 416 (see FIG. 4), the memory usage at an individual processing node 104 and send memory usage data to respective coordinators 102. The coordinators 102 may use the memory usage data from all of the processing nodes 104 to determine the amount of memory currently available on each of the processing nodes 104 to be dedicated to locally executing the query plan on the processing nodes 104. The coordinators 102 optimize the query plans, or the query plan segments, for globally optimal execution performance on the processing nodes 104, and send the query plan, or query plan segments, to each of the processing nodes 104.

Similarly, in an alternative embodiment each of the processing nodes 104 monitor the memory usage at the individual processing nodes 104, for example, using the remote memory manager 114. Each of the individual processing nodes 104 determines the amount of memory currently available on the individual processing node 104 to be dedicated to locally executing the query plan on the processing node 104. Each of the individual processing nodes 104 further performs localized query planning to adapt query plan segments received from one of the coordinators 102 for optimal execution performance on the individual processing nodes 104, as explained further below.

Figure 3:
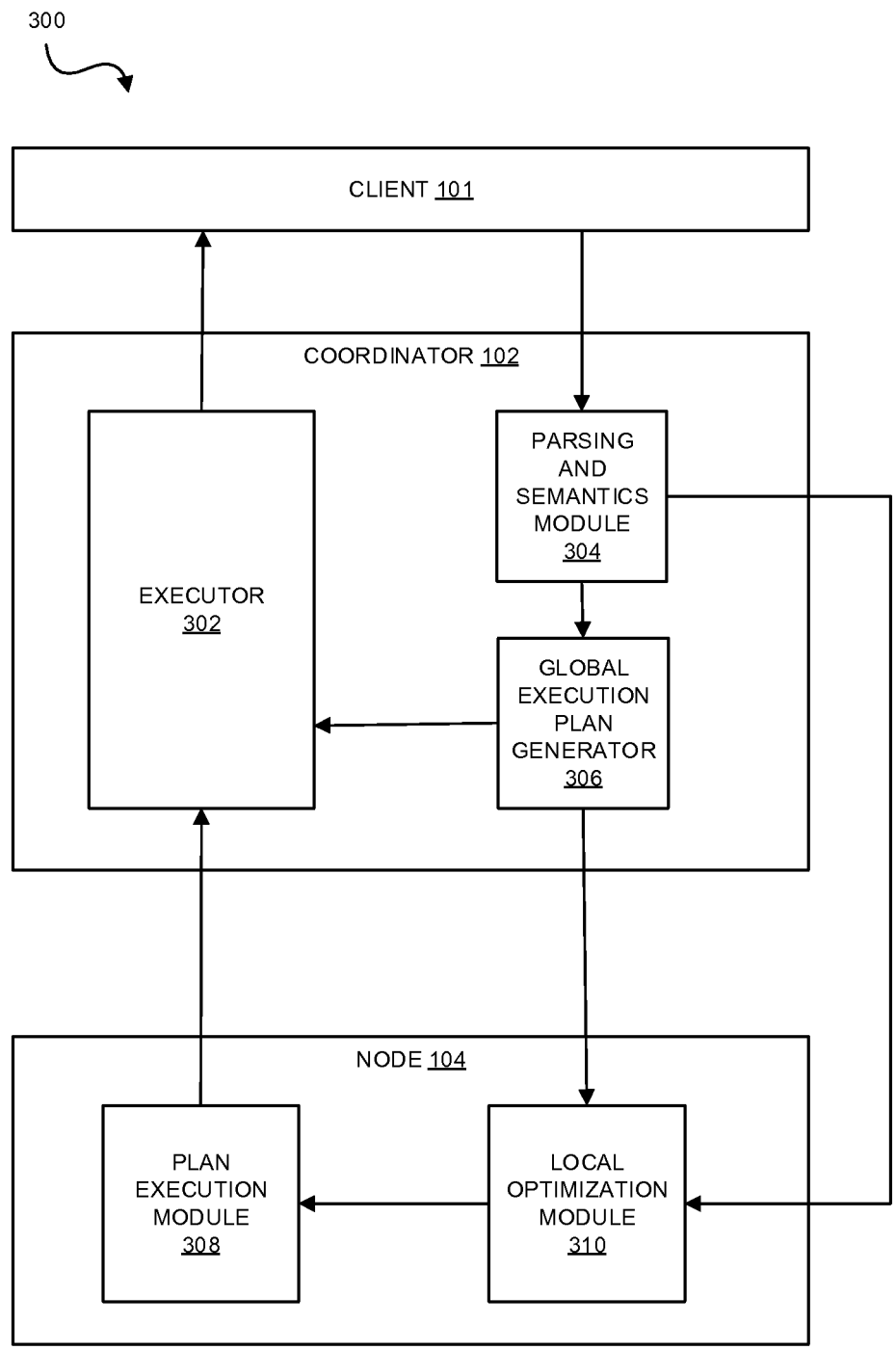
FIG. 3 is an exemplary diagram of a MPP database system for compiling an execution plan in accordance with FIGS. 1 and 2.

FIG. 3 is an exemplary diagram of a MPP database system 300 for compiling an execution plan. The diagram illustrates a MPP database system 300 for responding to queries from a client 101, similar to the embodiments of FIGS. 1 and 2. In the exemplary embodiment, the MPP database system 300 includes a coordinator 102, a processing node 104, and remote processing nodes (not illustrated). The coordinator 102 includes, for example, a parsing and semantics module 304 for processing queries, a global execution plan generator 306 for generating a global execution plan, and an executor 302 for gathering/aggregating results and assembling a query response. The parsing and semantics module 304 may receive a query from the client 101 and develop a semantic tree. The semantic tree may be a general outline for responding to the query, and may form the foundation upon which the global execution plan is built. The semantic tree may then be sent to the global execution plan generator 306, which may generate the global execution plan in accordance with a global view of data distribution and resources. The global execution plan may then be sent to the executor 302, the processing node 104, and remote processing nodes in the MPP database system 300. The processing node 104, in addition or as an alternative to the above-disclosed embodiments, may comprise a local optimization module 310 configured to optimize the execution plan in view of local configuration information native to the processing node 104. More specifically, a local execution plan (or local execution plan segments) may be developed in accordance with the semantic tree. In various embodiments, the local optimization module 310 may use constraints defined by the global execution plan to fortify the semantic tree (or a sub-tree derived therefrom), in order to ensure that the constraints are satisfied. The local optimization module 310 may then send the selected execution plan to the plan execution module 308, which may execute the plan. The plan execution module 308 may thereafter transfer the result (directly or indirectly) to the executor 302 of the coordinator 102 for processing into the query response.

Figure 4:
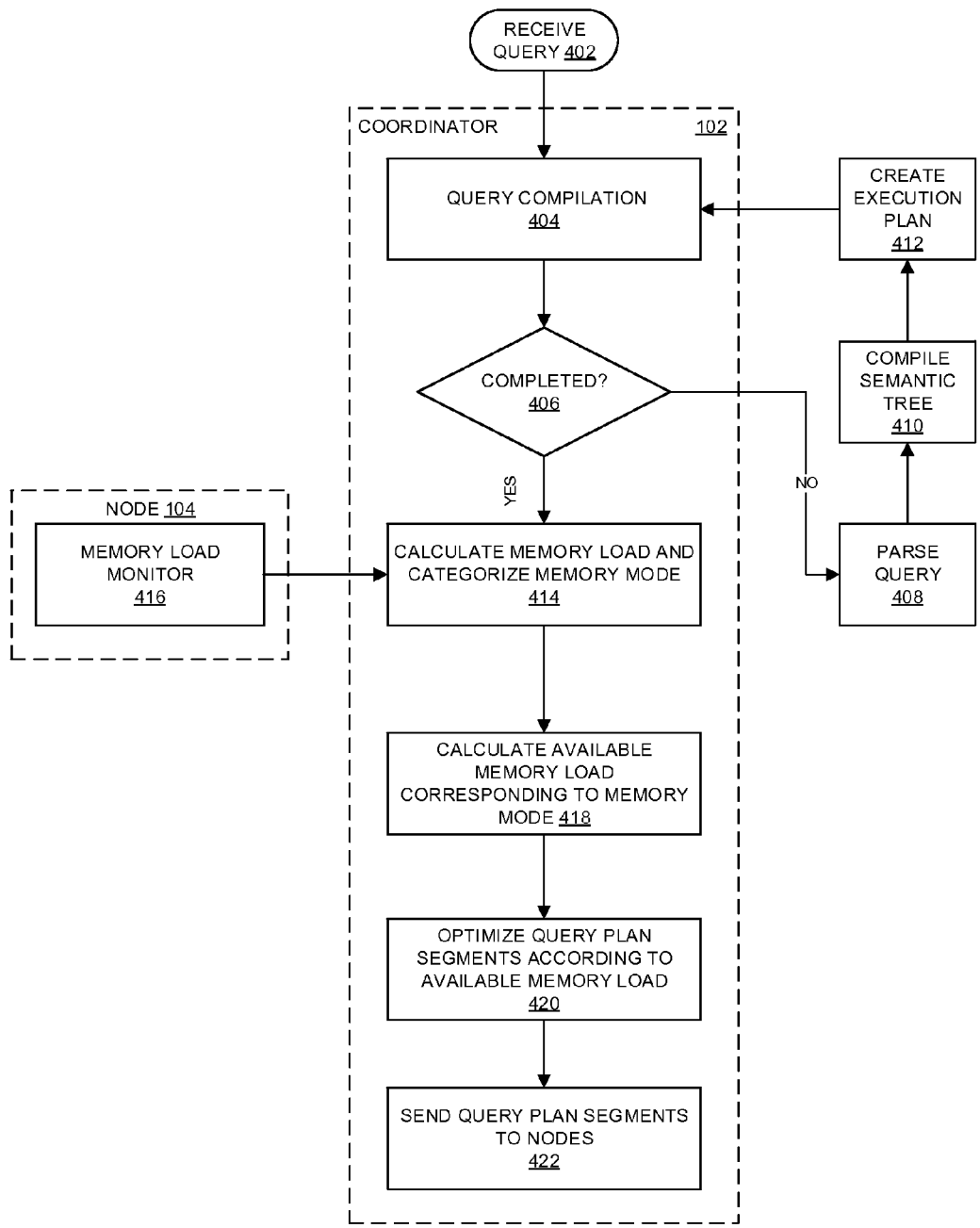
FIG. 4 is an exemplary flowchart of a process for compiling an execution plan in accordance with FIGS. 1-3.

FIG. 4 is an exemplary flowchart of a process for compiling an execution plan in accordance with FIGS. 1 and 2.

The process begins at 402, where a query request, such as a structured query language (SQL) query, is received, for example, from a client 101 at a coordinator 102. At 404, a query is compiled. For example, a semantic tree corresponding to the query can be compiled. At 406, the coordinator 102 determines whether the compilation has been completed. If not, the received query is parsed at 408, and the semantic tree is compiled at 410. A candidate query execution plan or plans are created based on the semantic tree at 412. If the compilation is determined to be completed at 406, the process continues to 414. Processing node 104, via memory load monitor 416, sends the current memory usage or availability information regarding the individual processing nodes 104 to the coordinator 102. At 414, the current global memory load is calculated using the received memory usage or availability data.

Memory load or space availability of memory in the processing node 104 in the MPP database system 100 is monitored by a memory load monitor 416. The memory load monitor 416 may reside on each of the processing nodes 104 in the MPP database system 100, and is responsible for monitoring the memory usage and availability on a processing node 104. In general, available memory in a processing node 104 that may be used to cache data is determined by deducting the amount of memory required for a query operation(s) from the total amount of memory (or available memory). For example, if the total amount of memory is 10 GB, and the amount of memory required for a query operation is 8 GB, then 2 GB of memory remain available.

A memory mode is assigned to an appropriate category corresponding to the current global memory load at 418. The memory mode is set to a high, medium or low level depending upon, for example, the memory usage of the system 100. The available global work memory is computed and used at 420 to optimize the query execution plan (or plan segments) by distributing the workload based on the global work memory. The query execution plan for distribution to the processing nodes 104, and a query execution plan segment, or segments, is transmitted to each of the processing nodes 104 in the MPP database system 100 at 422. Additionally, the compiled semantic tree is forwarded to the processing nodes 104.

Figure 5:
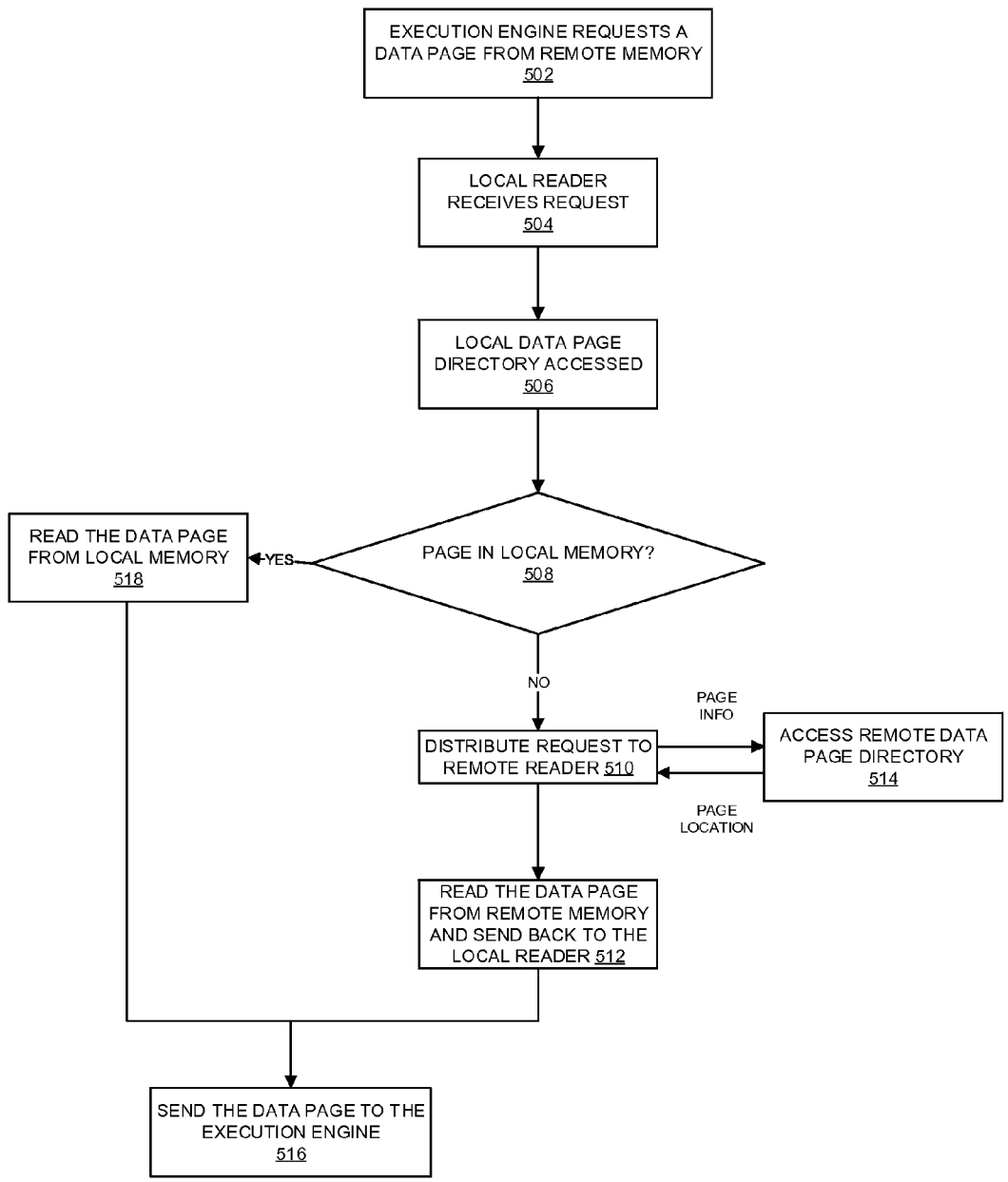
FIG. 5 is an exemplary flow chart of a process of caching data in memory for execution in accordance with the MPP database system of FIGS. 1 and 2.

FIG. 5 is an exemplary flow chart of a process of caching data for execution in accordance with the MPP database system of FIGS. 1 and 2. Upon receipt of a query from coordinator 102, the execution engine 106 requests a data page that corresponds to the query from the local reader 108 (i.e., the reader at the local processing node) at 502. The local reader 108 receives the request at 504 and accesses the local data page directory 112 for the requested data page at 506. The local page directory 112, when accessed, determines whether the requested data page is in the local memory (e.g., memory of the local processing nod), at 508. At 518, in response to determining the local data page directory 112 includes the data page, the local reader 108 fetches the data page from the local memory at 518, and sends the data page to the execution engine 106 of the local processing node 104 at 516. On the other hand, at 510, in response to determining the local data page directory 112 fails to include the requested data page, the reader 108 distributes the request to a remote reader 108 (i.e., the reader at a remote processing node) where the data page is being stored. The requested data page is retrieved from the remote memory by accessing (at 514) the location of the data page directory 112 of the remote processing node at 512. The retrieved data page is then sent from the remote reader 108 back to the local reader 108 at 512, and forwarded to the execution engine 106 of the local processing node 104 at 516.

Figure 6:
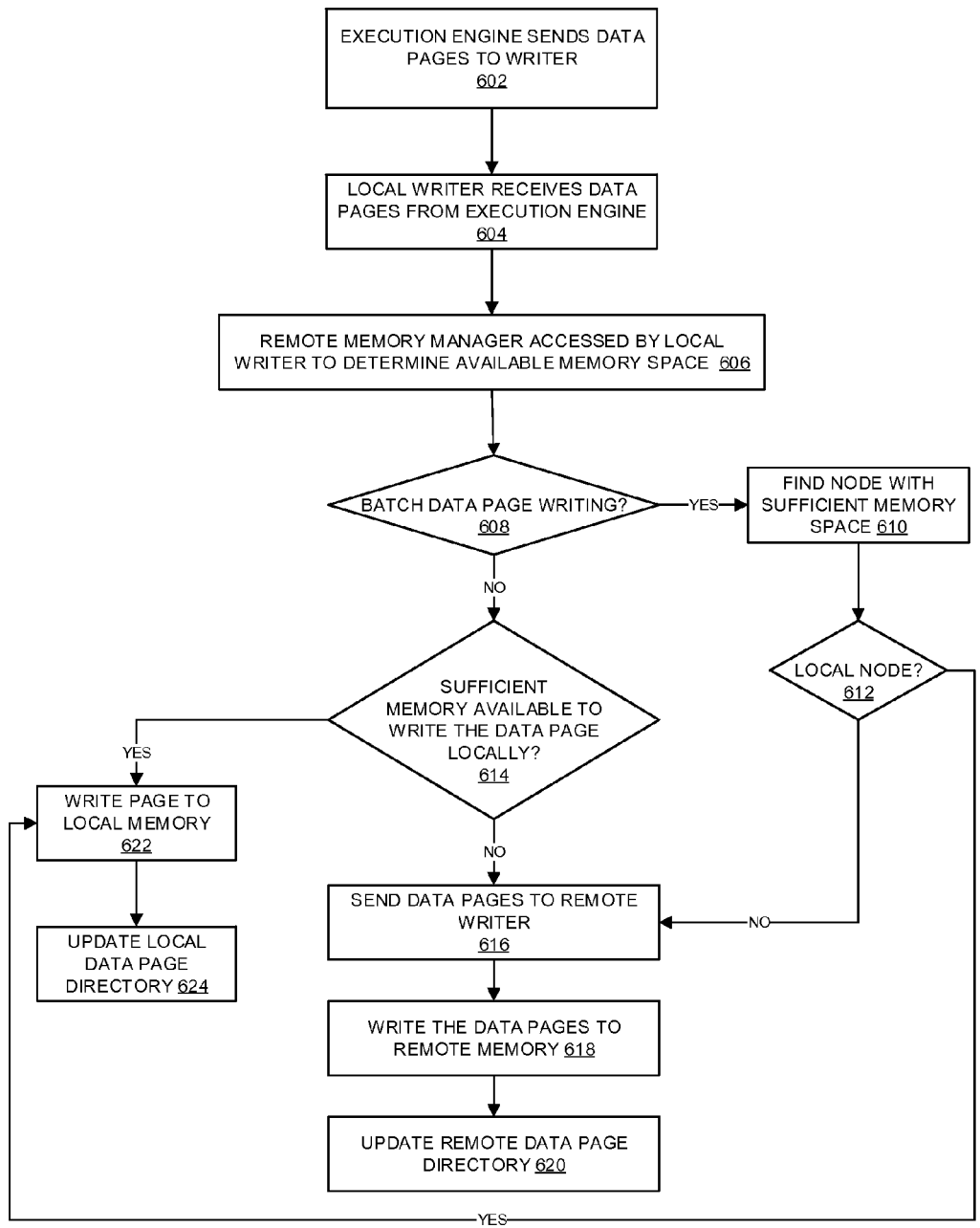
FIG. 6 is an exemplary flow chart of a process of caching data in memory in accordance with the system of FIGS. 1 and 2.

FIG. 6 is an exemplary flow chart of a process of writing data pages to memory in accordance with the MPP database system of FIGS. 1 and 2. Upon receipt of a query from the coordinator 102, the execution engine 106 sends the query with data pages corresponding to the query to a local writer 110 (e.g., the writer at the local processing node) at 602. At 604, the local writer 110 receives the data pages from the execution engine 106, and the remote cache module RC is accessed by the local writer 110 to determine the amount of available space in the local memory at the local processing node 104 at 606. Prior to determining the amount of available space, the local writer 110 identifies whether the query is to batch write the data pages at 608. If the local writer 110 determines that batch writing has not been requested, the local writer 110 queries the remote cache module RC to determine whether sufficient space is available to write the data pages in local memory at 614. In response to determining that sufficient space in the local memory is available, the local writer 110 writes the data pages to the local memory at 622, and updates the data page directory 112 of the local processing node 104 at 624. On the other hand, in response to determining that insufficient space in the local memory is available at 614, the local writer 110 sends the data pages to a remote writer 110 (e.g. a writer at the remote processing node 104 determined by the remote cache module RC to have sufficient space available) at 616. The data pages are written by the remote writer 110 at the remote processing node 104 to the remote memory at 618, and the data page directory 112 of the remote processing node 104 is updated accordingly. If the local writer 110 determines that batch writing of the data pages has been requested at 608, the local writer 110 queries the remote cache module RC to find a processing node (local or remote) with sufficient memory to store the batch written data pages at 610. At 612, the remote cache module RC informs the local writer 110 whether sufficient space is available to batch write the data pages in local memory. If insufficient space is available, then the process proceeds to 616 and continues as described above. If, on the other hand, sufficient space is available, then the process proceeds to 622 and continues as described above.

Figure 7:
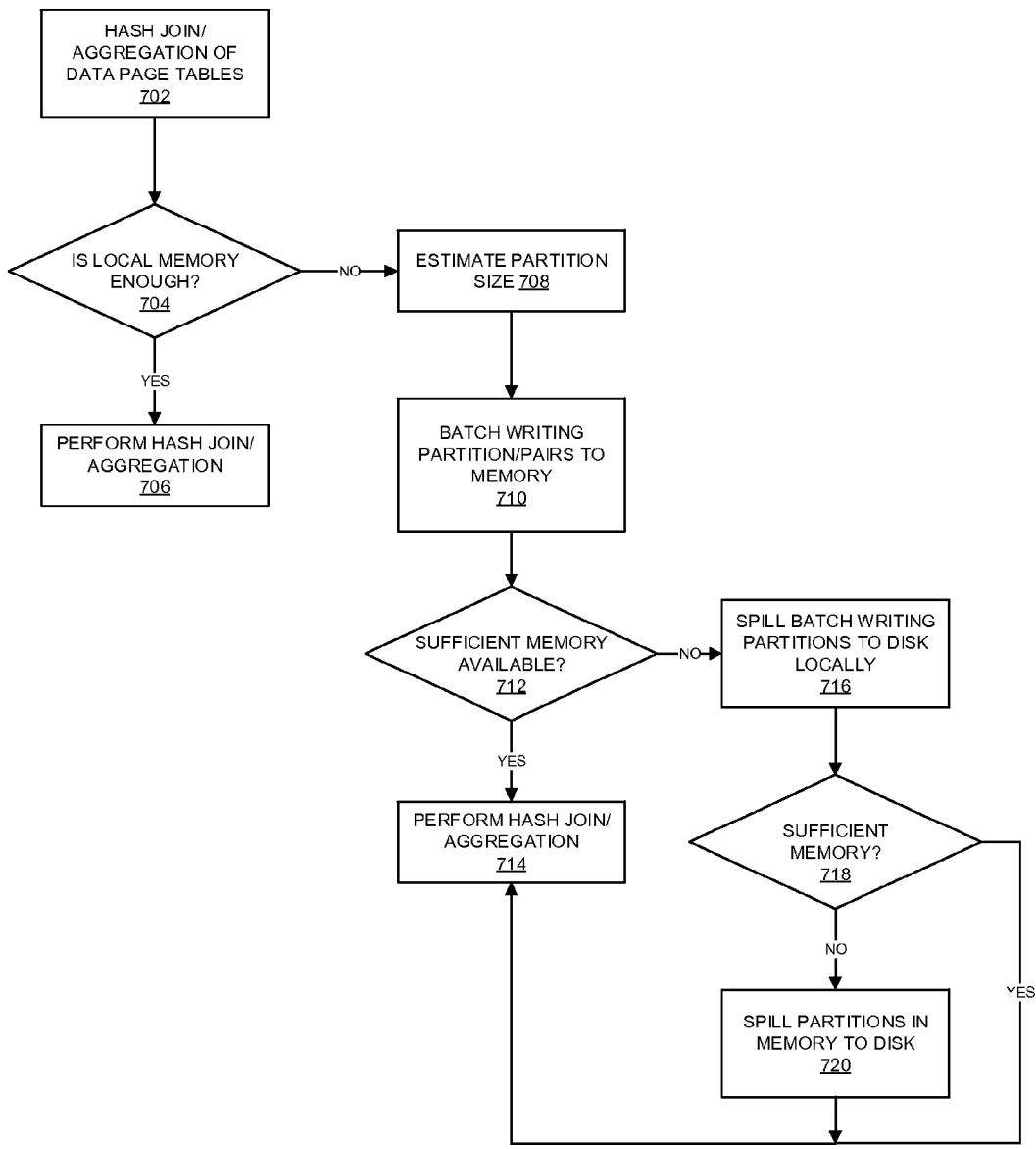
FIG. 7 is an exemplary flow chart of processing data in accordance with the system of FIGS. 1 and 2.

FIG. 7 is an exemplary flow chart of processing data in accordance with the MPP database system of FIGS. 1 and 2. In one embodiment, a hash join or aggregation operation of data page tables is initiated at 702 to join or aggregate the database tables located at the various processing nodes in the MPP database system 100. Although the exemplary embodiment is described with reference to hash join and aggregation, the disclosure is not limited to such examples. As appreciated by the skilled artisan, any form of join, aggregation, sort, merge, etc. may be utilized. At 704, the remote cache module RC determines whether sufficient memory exits in the local processing node 104. When sufficient memory is available, the hash join or aggregation is performed utilizing the local memory at the local processing node 104 at 706. If the remote cache module RC determines that insufficient local memory is available to perform the hash, then the hash join or aggregation tables may be partitioned. For example, for a hash join, the hash table may be partitioned into an inner and outer join tables using the same hash function and bucket number. Performing the inner and outer join tables using the same hash function and bucket creates pairs of partitions. For each pair, one is from the inner table and one is from the outer table. For a hash aggregation, the hash table is partitioned using one table. However, prior to creating the partitions (or pairs of partitions), the remote cache module RC uses the data of the partitions from a data page table in memory to estimate the size of each partition at 708, as follows:

$$\text{size\_of\_partition}(i) = \text{table\_size\_on\_disk} \times \frac{\text{in\_memory\_size\_of\_partition}(i)}{\text{size\_of\_table\_in\_memory}}.$$

At 710, the remote writer 110 is invoked by the execution engine 106 to begin to batch write the partitions (or pairs) to cache at remote processing node 104. The batch writing applies the batch data pages writing mode using the estimated partition size calculated at 708 such that the partitions (or pairs) are stored on the same processing node. In one embodiment, a partition ID is used as the batch ID for batch data page writing. Prior to batch writing the partitions (or pairs) to the memory of the remote processing node 104, the remote memory manager 114 confirms that sufficient remote memory exists at 712. After each of the partitions (including the inner and outer tables for a hash join) are spilled to the remote memory, the execution engine 106 performs the partition wise join or aggregation at each processing node 104 and locally stores the partition (or pairs), at 714. The execution engine 106 reads, via reader 108, the partitions (or pairs) from each memory managed by the remote cache modules RC and joins/aggregates the partitions (or pairs) accordingly. For the partitions (or pairs) that are written to the remote cache module RC using the batch data page writing at 710, the partitions (or pairs) are joined/aggregated at a local processing node 104 (i.e., the same node) even if they are read from a remote cache module RC on a different, remote processing node 104. Notably, this process not only avoids data transfer, but also balances the work load in the MPP database system 100.

At 712, if the remote cache module RC determines that insufficient memory is available within the MPP database system 100, the batch written partitions (or pairs) are spilled to a storage (e.g., disk) on the local processing node 104 at 716. After the batch written partitions (or pairs) are spilled by the execution engine 106 locally to the storage at 716, the remote memory manager 114 determines whether sufficient memory exists in memory managed by the remote cache module RC at 718. If the memory for the remote cache module RC is insufficient, the execution engine 106 spills the data pages in the memory to the storage at 720. Similar to the batch writing process above, batch written partitions (or pairs) are joined/aggregated at a local processing node 104 at 714. Otherwise, the partitions are joined/aggregated using a regular partition wise join/aggregation at 714.

Figure 8:
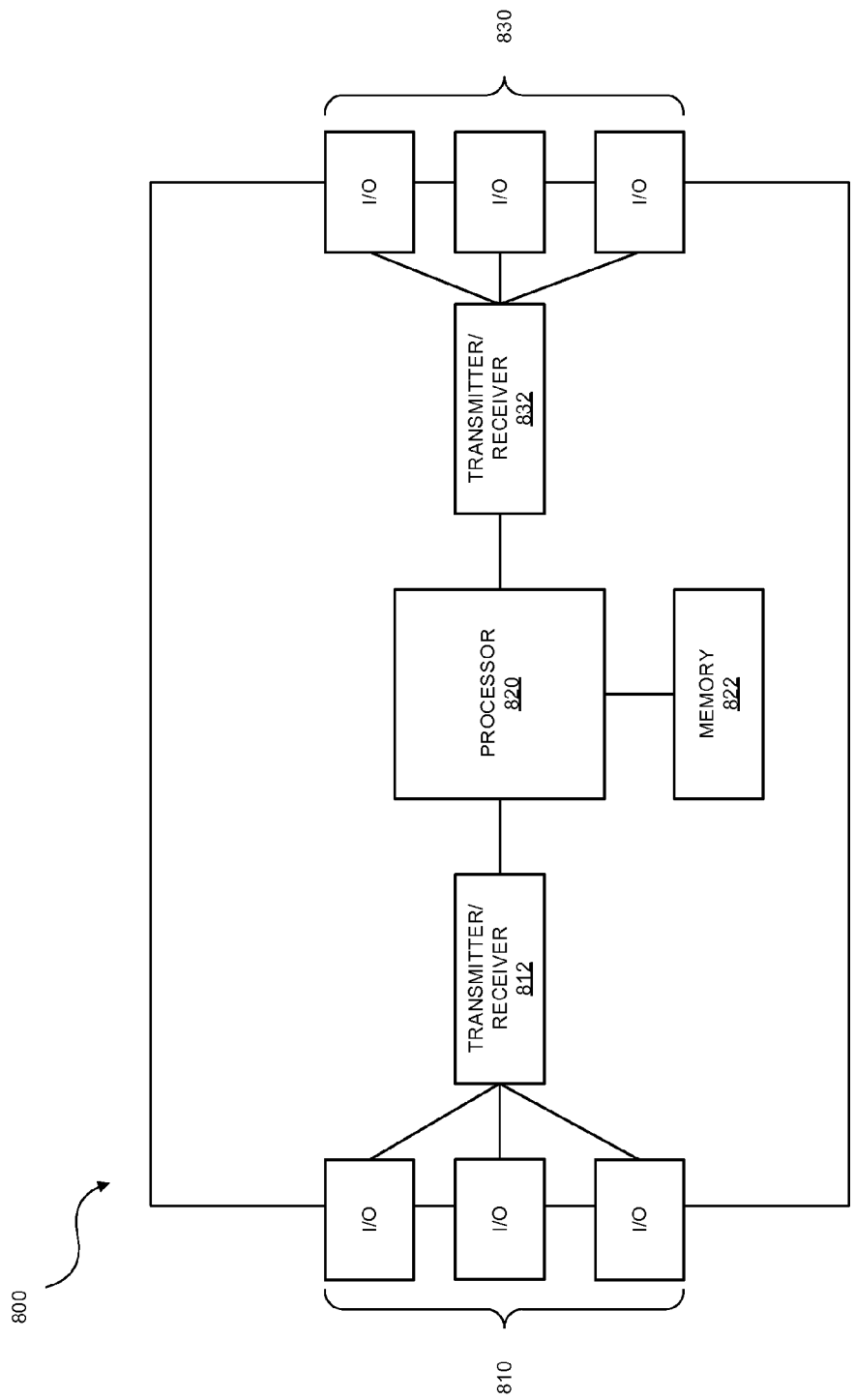
FIG. 8 is an embodiment of a processing node in accordance with FIGS. 1 and 2.

FIG. 8 illustrates an embodiment of a node. The node 800 may be, for example, a router, a coordinator node 102, a local or remote processing node 104, or any other node in the MPP database system 100. The node 800 may comprise one or more input/output ports 810 and 830 and/or transmitter/receiver (Tx/Rx) 812 and transmitter/receiver (Tx/Rx) 832 for receiving and transmitting data, a processor 820 to process data, and a memory 822. The one or more input/output ports 810 and 830 provide the transmitters/receivers (Tx/Rx) 812 and 832 with the capability of transmitting and receiving data simultaneously from multiple external sources. It is appreciated that the disclosed embodiment is not limited to a specific number of input/output ports, and any number of ports may be utilized. The components described herein may be supplemental to or provided in the alternative to the components of a processing node 104 as described above. The node 800 may also generate and distribute various requests and queries, such as a SQL query. Although illustrated as a single processor, the processor 820 is not so limited and may comprise multiple processors. The processor 820 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 820 may be configured to implement any of the schemes described herein, such as the processes illustrated in FIGS. 3 and 5-7, using any one of or a combination of methods described in the embodiments. Moreover, the processor 820 may be implemented using hardware, software, or both. The memory 822 may be configured to store tables, forwarding tables, or other tables or information disclosed herein. Although illustrated as a single memory, memory 822 may be implemented as a combination of read only memory (ROM), random access memory (RAM), or secondary storage (e.g., one or more disk drives or tape drives used for non-volatile storage of data).

FIG. 9 is a block diagram of a network system 900 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system 900 may comprise a processing unit 901 equipped with one or more input/output devices, such as a network interfaces, storage interfaces, and the like. The processing unit 901 may include a central processing unit (CPU) 910, a memory 920, a mass storage device 930, and an I/O interface 960 connected to a bus 970. The bus 970 may be one or more of any type of several bus architectures including a memory bus or memory controller, a peripheral bus or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. The mass storage device 930 may comprise any type of storage device configured to store data, programs, and other information and to make the data, programs, and other information accessible via the bus 970. The mass storage device 930 may comprise, for example, one or more of a solid state drive, hard disk drive, a magnetic disk drive, an optical disk drive, or the like.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via a network or networks 980. For example, the network interface 950 may provide wireless communication via one or more transmitters/transmit antennas and one or more receivers/receive antennas. In an embodiment, the processing unit 901 is coupled to a LAN or a WAN for data processing and communications with remote devices, such as other processing units, the Internet, remote storage facilities, or the like.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of managing data caching in processing nodes of a massively parallel processing (MPP) database system, comprising:
maintaining a directory including a list of data pages, the list of data pages stored in one or more data tables, and a storage location of the data pages in the MPP database system;
monitoring memory usage in one or more of the processing nodes of the MPP database system by exchanging memory usage information with each of the one or more processing nodes in the MPP database system, each of the one or more processing nodes managing a list of the one or more processing nodes and a corresponding amount of available memory in each of the one or more processing nodes based on the memory usage information;
reading data pages from a memory of the one or more processing nodes in response to receiving a request to fetch the data pages; and
querying a remote memory manager for available memory in each of the one or more processing nodes in response to receiving a request and distributing the data pages to the memory of one of the one or more processing nodes having sufficient space available for storage during data processing by the one or more processing nodes;
wherein, the method further comprises:
generating a hash table based on the data tables;
in response to the remote memory manager determining that sufficient local memory is available, the hash table is written to the local memory; and
in response to the remote memory manager determining that insufficient local memory is available:
partitioning the hash table and estimating a size of a partition for each of the partitions according to:

$$\text{size\_of\_partition}(i) = \text{table\_size\_on\_disk} \times \frac{\text{in\_memory\_size\_of\_partition}(i)}{\text{size\_of\_table\_in\_memory}};$$

and
instructing the remote memory manager to spill the partitions using a batch writing mode to the remote memory of the remote processing node based on the estimated size of the partitions.

2. The method of claim 1, further comprising:
calculating the memory usage information based on a memory load of a corresponding memory on the one or more processing nodes, wherein the memory load is determined from the monitoring of individual memories associated with the one or more processing nodes; and
exchanging heart-beat messages between the one or more processing nodes, the heart-beat message carrying the memory usage information about each of the one or more processing nodes to update the list of one or more processing nodes detailing available space in the memory for each of the one or more processing nodes in the MPP database.

3. The method of claim 1, wherein the amount of available space in the memory is determined by accessing the remote memory manager, further comprising:
in response to the remote memory manager determining that sufficient space is available in local memory of the one or more processing nodes, distributing the data pages to the local memory and updating the directory; and in response to the remote memory manager determining that insufficient space is available in local memory, sending the data pages to a remote processing node of the one or more processing nodes determined to have sufficient space available in remote memory, writing the data pages to the remote memory and updating the directory of the remote processing node to reflect the written data pages.

4. The method of claim 1, further comprising:

querying the directory of a local processing node of the one or more processing nodes for the data pages, in response to determining the directory of the local processing node includes the data pages, reading the data pages from the directory and sending the data pages to an execution engine of the local processing node; and in response to determining the directory of the local processing node fails to include the data pages, sending the query to a remote reader on a remote processing node of the one or more processing nodes storing the data page, retrieving the memory location of the data pages from the directory of the remote processing node, and reading the data pages to the reader at the local processing node.

5. The method of claim 4, wherein the execution engine, in response to completing the query by the remote processing node, instructs the remote processing node to refresh the memory, further comprising:

the remote processing node, in response to the instruction, searches the directory and deletes the data pages read from the directory and deallocates the memory.

6. A node for processing data in a massively parallel processing (MPP) database system, the node comprising:

a processor;

a memory containing computer instructions that, when executed by the processor, prompt the processor to:
request a data page including identifying data page information corresponding to the data page; and
monitor memory usage and availability of memory in one or more processing nodes of the MPP database system;

a remote cache module, including a data page directory to maintain data pages in one or more data tables and a location of the data pages stored in the memory of the one or more processing nodes in the MPP database system;

a remote memory manager to manage the memory on the one or more processing nodes and to exchange memory information with each of the one or more processing nodes in the MPP database system, the remote memory manager maintaining a list of the one or more processing nodes and a corresponding amount of available memory in each of the one or more processing nodes as determined by the memory load monitor;

a local reader to fetch the data pages having the identifying data page information from one of the processing nodes in response to receiving a request from the execution engine; and a local writer to query the remote memory manager for available space in the memory of each of the one or more processing nodes in response to receiving a request from the execution engine and to distribute the data pages to the memory of the one or more processing nodes having sufficient space available as determined by the remote memory manager;

in response to the execution engine receiving a hash instruction, the execution engine generates a hash table based on the data tables;

in response to the local writer determining that sufficient local memory is available, the hash table is written to the local memory of the local processing node; and in response to the local writer determining that insufficient local memory is available, the execution engine:

partitions the hash table, and estimates a size of a partition for each of the partitions according to:

$$\text{size\_of\_partition}(i) = \text{table\_size\_on\_disk} \times \frac{\text{in\_memory\_size\_of\_partition}(i)}{\text{size\_of\_table\_in\_memory}};$$

and instructs the local writer to spill the partitions using a batch writing mode to the remote memory of the remote processing node based on the estimated size of the partitions.

7. The processing node of claim 6, wherein the local writer determines the amount of available space in the memory by accessing the remote memory manager, further comprising:

in response to determining that sufficient space in local memory of the one or more processing nodes is available, the local writer distributes the data pages to the local memory and updates the data page directory to reflect the distributed data pages; and in response to determining that insufficient space in the local memory is available, the local writer distributes the data pages to a remote writer in a remote processing node of the one or more processing nodes determined by the remote memory manager to have sufficient space available in remote memory, the data pages are distributed to the remote memory of the remote processing node and a data page directory of the remote processing node is updated to reflect the distributed data pages.

8. The processing node of claim 6, further comprising:

a local reader querying the data page directory of a local processing node of the one or more processing nodes for the data page;

in response to determining the data page directory includes the data page, the local reader reading the data page from the data page directory and sending the data page to the execution engine of the local processing node; and in response to determining the data page directory of the local processing node fails to include the data page, the local reader sending the query to a remote reader on a remote processing node of the one or more processing nodes storing the data page, retrieving the memory location of the data page from the data page directory of the remote processing node, and reading the data page to the local reader.

9. A computer-readable storage device comprising instructions which cause one or more processors to execute a method of managing data caching in processing nodes of a massively parallel processing (MPP) database system, comprising:

maintaining a directory including a list of data pages, the list of data pages stored in one or more data tables, and a storage location of the data pages in the MPP database system;

monitoring memory usage in one or more of the processing nodes of the MPP database system by exchanging memory usage information with each of the one or more processing nodes in the MPP database system, each of the one or more processing nodes managing a list of the one or more processing nodes and a corresponding amount of available memory in each of the one or more processing nodes based on the memory usage information;

reading data pages from a memory of the one or more processing nodes in response to receiving a request to fetch the data pages; and querying a remote memory manager for available memory in each of the one or more processing nodes in response to receiving a request and distributing the data pages to the memory of one of the one or more processing nodes having sufficient space available for storage during data processing by the one or more processing nodes;

in response to the execution engine receiving a hash instruction, the execution engine generates a hash table based on the data page tables;

in response to the local writer determining that sufficient local memory is available, the hash table is written to the local memory of the local processing node; and in response to the local writer determining that insufficient local memory is available, the execution engine:
  partitions the hash table, and estimates a size of a partition for each of the partitions according to:

$$\text{size\_of\_partition}(i) = \text{table\_size\_on\_disk} \times \frac{\text{in\_memory\_size\_of\_partition}(i)}{\text{size\_of\_table\_in\_memory}}.$$

and
  instructs the local writer to spill the partitions using a batch writing mode to the remote memory of the remote processing node based on the estimated size of the partitions.

* * * * *